US008679300B2

(12) United States Patent
Smith et al.

(10) Patent No.: US 8,679,300 B2
(45) Date of Patent: Mar. 25, 2014

(54) INTEGRATED RIG FOR THE PRODUCTION OF BORON NITRIDE NANOTUBES VIA THE PRESSURIZED VAPOR-CONDENSER METHOD

(75) Inventors: Michael W. Smith, Newport News, VA (US); Kevin C. Jordan, Newport News, VA (US)

(73) Assignees: Jefferson Science Associates, LLC, Newport News, VA (US); The United States of America as represented by the Administrator of Nasa, Washington, DC (US)

(*) Notice: Subject to any disclaimer, the term of this patent is extended or adjusted under 35 U.S.C. 154(b) by 8 days.

(21) Appl. No.: 13/200,315

(22) Filed: Sep. 22, 2011

(65) Prior Publication Data

US 2012/0175242 A1    Jul. 12, 2012

Related U.S. Application Data

(63) Continuation-in-part of application No. 12/387,703, filed on May 6, 2009, which is a continuation-in-part of application No. 12/322,591, filed on Feb. 4, 2009.

(60) Provisional application No. 61/460,993, filed on Jan. 11, 2011.

(51) Int. Cl.
*B01J 19/12* (2006.01)
*C04B 14/32* (2006.01)
*B01J 19/08* (2006.01)

(52) U.S. Cl.
USPC ............ 204/157.41; 204/157.45; 204/157.46; 422/186

(58) Field of Classification Search
USPC ........... 204/157.45, 157.41, 157.46; 422/186; 977/896
See application file for complete search history.

(56) References Cited

U.S. PATENT DOCUMENTS

| | | | |
|---|---|---|---|
| 6,680,041 B1* | 1/2004 | Kumar et al. | 75/330 |
| 7,184,614 B2* | 2/2007 | Slatkine | 385/5 |
| 7,575,784 B1* | 8/2009 | Bi et al. | 427/567 |
| 7,663,077 B1* | 2/2010 | Smith et al. | 977/844 |
| 7,767,270 B1 | 8/2010 | Khare et al. | |
| 2002/0148560 A1 | 10/2002 | Carr | |
| 2002/0175278 A1* | 11/2002 | Whitehouse | 250/281 |
| 2003/0203205 A1* | 10/2003 | Bi et al. | 428/402 |
| 2006/0096393 A1* | 5/2006 | Pesiri | 73/863.21 |
| 2007/0295702 A1* | 12/2007 | Tenegal et al. | 219/121.84 |
| 2008/0199389 A1 | 8/2008 | Chiu et al. | |
| 2008/0225464 A1* | 9/2008 | Lashmore | 423/447.2 |
| 2009/0044705 A1* | 2/2009 | Takayanagi et al. | 96/381 |

(Continued)

OTHER PUBLICATIONS

"Synthesis of nanoparticles by a laser-vaporization-controlled condensation technique," Samy S. El-Shall, Shoutian Li, Proc. SPIE. 3123, Materials Research in Low Gravity 98 (Jul. 7, 1997) doi: 10.1117/12.277711.*

(Continued)

*Primary Examiner* — Keith Hendricks
*Assistant Examiner* — Colleen M Raphael

(57) ABSTRACT

An integrated production apparatus for production of boron nitride nanotubes via the pressure vapor-condenser method. The apparatus comprises: a pressurized reaction chamber containing a continuously fed boron containing target having a boron target tip, a source of pressurized nitrogen and a moving belt condenser apparatus; a hutch chamber proximate the pressurized reaction chamber containing a target feed system and a laser beam and optics.

18 Claims, 3 Drawing Sheets

(56) References Cited

U.S. PATENT DOCUMENTS

2009/0117021 A1    5/2009    Smith et al.
2010/0192535 A1    8/2010    Smith et al.
2010/0219383 A1    9/2010    Eklund

OTHER PUBLICATIONS

Smith, M.W. et al., Very Long single-and Few-walled Boron nitride Nanotubes Via the Pressurized Vapor/condenser Method; Nanotechnology 20 (2009) 505604.

Ma, Renzhi et al., Synthesis and Properties of B-C-N And BN Nanostructure, Phil. Tran.:Math., Phys. and Eng. Sciences, vol. 362, No. 1823, (Oct. 15, 2004), pp. 2161-2186.

Goldberg, Dmitri et al., Nanotubes in Boron Nitride Laser Heated at High Pressure, Appl. Phys. Lett. 69 (14), Sep. 30, 1996, 2045-2047.

Goldberg, Dmitri et al., Boron Nitride Nanotubes, Adv. Mater., 2007, 19, 2413-2434.

Zhi, Chunyi et al., Effective Precursor for High Yield Synthesis of Pure BN Nanotubes, Solid State Communications 135 (2005) 67-70.

Bansal, Narottam et al., Boron Nitride Nanotubes-Reinforced Glass Composites, NASA/TM 2005-213874, Aug. 2005.

\* cited by examiner

INTEGRATED RIG FOR THE PRODUCTION OF BORON NITRIDE NANOTUBES VIA THE PRESSURIZED VAPOR-CONDENSER METHOD

This application claims the benefit of U.S. Provisional Application No. 61/460,993 filed on Jan. 11, 2011 for an Integrated Rig For The Production of BNNTs Via The PVC Method and is a Continuation-In-Part of U.S. patent application Ser. No. 12/387,703, filed on May 6, 2009 and entitled "Boron Nitride Nanotube Fibrils and Yarns", which is a Continuation-In-Part of U.S. patent application Ser. No. 12/322,591, filed on Feb. 4, 2009 and entitled "Apparatus for the Production of Boron Nitride Nanotubes".

The United States government may have certain rights to this invention under the National Aeronautics and Space Administration and/or Management and Operating Contract No. DE-AC05-06OR23177 from the Department of Energy.

FIELD OF THE INVENTION

The invention relates generally to an apparatus for the production of nanostructures in particular to the formation of long strand boron nitride nanotube fibers or filaments.

BACKGROUND

Since the announcement of the successful synthesis of high-aspect-ratio-few-walled boron nitride nanotubes (FW-BNNTs) in 1995, little progress had been made until very recently in the scale-up of their synthesis. In spite of the theoretical capabilities of FW-BNNTs to provide high strength-to weight, high temperature resistance, piezo actuation, and radiation shielding (via the boron content), the aerospace industry has had to rely on micron-sized graphite or boron fibers for structural applications. Further, despite their very desirable properties, neither FW-BNNTs nor single wall carbon nanotubes are used widely in aerospace manufacturing, as the industry is generally unwilling to pay the premium price for these high performance materials.

Prior to recent inventions of the present inventors, high-aspect ratio FW-BNNTs had only been produced in small amounts by arc-discharge or laser heating methods. Further, these small amounts of FW-BNNTs were in the form of films not strands or fibers several centimeters in length. A separate class of boron nitride nanotubes known in the prior has been produced by chemical vapor deposition of nitrogen compounds (e.g. ammonia) over ball-milled precursors, but these tubes are of large diameter, do not exhibit the continuous crystalline sp2-type bonding structure which has drawn most theoretical interest, and are not strands or fibers.

The Inventors' recent work in the field of boron nitride nanotubes is described in four US. patent applications. Inventors' U.S. patent application Ser. No. 12/152,414 filed May 14, 2008 and incorporated herein by reference in its entirety describes a process for the production of at least centimeter-long boron nitride nanotube strands or fibers. Inventors' U.S. patent application Ser. No. 12/322,591 filed Feb. 4, 2009 and incorporated herein by reference in its entirety describes an apparatus for production of boron nitride nanotubes and a method of continuous removal of the formed boron nitride nanotubes from the synthesis chamber. Inventors' U.S. patent application Ser. No. 12/387,703 filed May 6, 2009 and incorporated herein by reference in its entirety describes a method for production of fibrils and yarns. Inventor's U.S. patent application Ser. No. 13/199,101 filed Aug. 19, 2011 and incorporated herein by reference in its entirety for a feedstock delivery device describes the delivery of material to a reaction chamber or process-controlled zone.

As high-aspect ratio boron nitride nanostructures with high crystallinity bonding structure are be highly desirable, improved methods and equipment for their production is likewise highly desirable.

SUMMARY OF INVENTION

The invention provides an integrated production apparatus for production of boron nitride nanotubes via the pressure vapor-condenser method. The apparatus comprises: a pressurized reaction chamber containing a continuously fed boron containing target having a boron target tip, a source of pressurized nitrogen and a moving belt condenser apparatus; a hutch chamber proximate the pressurized reaction chamber containing a target feed system wherein the target feed system provides a continuously fed boron containing target to the pressurized reaction chamber, a nitrogen control system in communication with the pressurized nitrogen; a laser beam and optics wherein the optics direct the laser beam though a laser beam tube, the hutch and into the pressurized reaction chamber; and a sliding safety shield positionable to surround at least a portion of the pressurized chamber.

The invention also provides a method of making boron nitride nanotubes having a high-aspect ratio and a high crystallinity bonding structure.

DETAILED DESCRIPTION OF THE INVENTION

The generation of very long single- and few-walled boron nitride nanotubes (BNNT) has been demonstrated via a pressurized vapor/condenser method. (See Inventors' U.S. patent application Ser. No. 12/152,414 incorporated herein by reference in its entirety.) In the pressurized vapor/condenser method few walled boron nitride nanotubes of high-aspect ratio and highly crystallinity fibers grow continuously by surface nucleation from seemingly arbitrary asperities at a high linear rate (centimeters per sec) in the line of flow of vaporized boron mixed with nitrogen under elevated pressures.

The inventors describe herein their invention of an integrated apparatus for the production of boron nitride nanotubes having a high-aspect ratio and a high crystallinity bonding structure. Boron nitride nanotubes and nanotube fibers are formed via a process in which hot boron vapor flows into nitrogen held in a pressurized synthesis chamber at an elevated pressure. The hot boron vapor flows through nitrogen towards a filament nucleation site. The filament nucleation site has a surface and the boron nitride nanotubes attach to the surface and boron nitride nanotube filaments propagate away there from in the direction of flow of the stream of boron vapor. Unlike in prior art in which films are typically formed over a surface, only a small portion of the boron nitride nanotube material actually attaches to the surface of the nucleation site, most of the material attaches to other boron nitride nanotubes to build filaments a centimeter or more in length.

As used herein a "boron nitride nanotube filament" means a fiber or strand. Typically, the boron nitride nanotube filaments are at least a centimeter long. When it is being formed the boron nitride nanotubes may appear as "streamers" to the naked eye because they extend outward and follow the flow of the hot boron vapor in the synthesis chamber and have sufficient length to have a flapping motion similar to a kite tail in the wind. In some embodiments, particularly in one in which the filament nucleation site is moved during the synthesis process, the streamers may intertwine to give a material that has a web like appearance.

As used herein the term "boron nitride" should be taken to include nanotubes comprising boron and nitrogen and accordingly includes nanotubes of the general formula $B_xC_yN_z$, for example.

As used herein a "filament nucleation site" is a structure which provides an attachment point for forming boron nitride nanotube filaments. The filament nucleation site is in the flow path of the hot boron vapor, but it should have a form and/or position that only minimally impacts the flow of the hot boron vapor.

Figure 1:
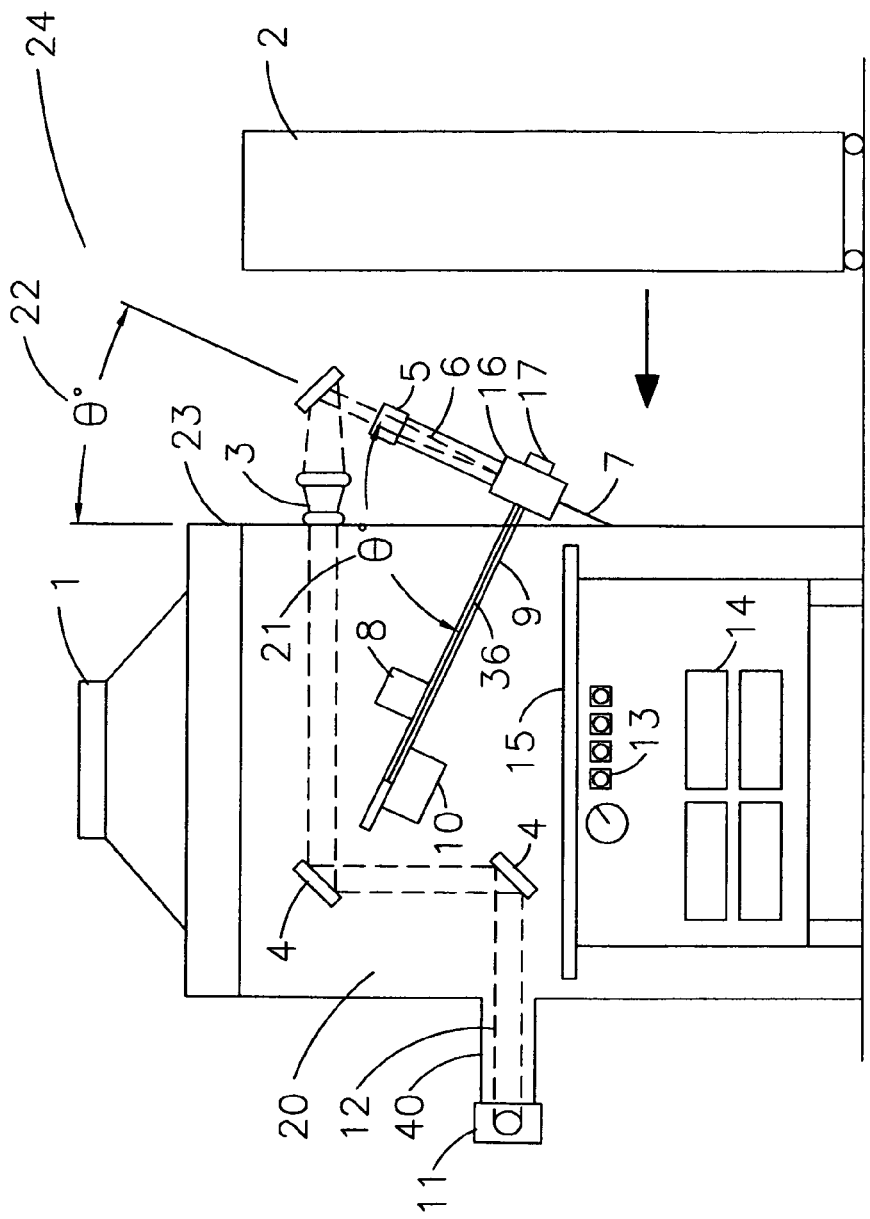
FIG. 1 is a schematic representation of an integrated rig apparatus for the production of boron nitride nanotubes.

Referring to FIG. 1 which is a schematic drawing of one embodiment of the integrated production apparatus for production of boron nitride nanotubes via the pressure vapor-condenser method. The apparatus comprises a pressurized reaction chamber 16, a hutch chamber 20 proximate the pressurized reaction chamber 16, a laser beam 12, and a sliding safety shield 2. The hutch chamber 20 further comprises a target feed system 9, an optical bench 15, gas pressure and flow controls 13 and electronic controls 14. The target feed system 9 provides for supporting and continuously feeding a boron target 36 into the pressurized reaction chamber 16. The gas pressure and flow controls 13 comprise a needle valve, pressure gauge and a regulator and are used for admitting nitrogen into the system and regulating the flow of nitrogen to maintain pressure in the pressurized reaction chamber 16. Flow rate is monitored by a chamber exhaust meter (not shown). The electronic controls 14 provide for control of the target feed system 9, control of the boron target 36 position and feed rate and laser beam 12 manipulation. During operation of the apparatus the operator may adjust the flow rate, pressure, laser power, laser focus, feed rate of the boron target 36, and position of the boron target 36 by adjusting one or more appropriate gas pressure and flow control 13 and/or one or more appropriate electronic control 14. The electronic controls 14 also provide for the control and adjustment of the rate of motion and position of the moving belt condenser (not shown in FIG. 1) in the pressurized chamber 16.

The entire integrated production apparatus is preferably enclosed in a metal and/or fire resistant box beneath an exhaust hood 1. For safety purposes, it is preferable to exhaust the system though a HEPA filter system. The metal and/or fire resistant box may have movable doors to provide access to the integrated production apparatus. The sliding safety shield 2 is movable. For operation the sliding safety shield 2 is positionable to surround at least a portion of the pressurized chamber 16 (i.e. is moved to cover the pressurized reaction chamber 16 portion of the apparatus). In a preferred embodiment the sliding safety shield 2 is lined with bullet proof (9 mm round) fiber board.

Figure 2:
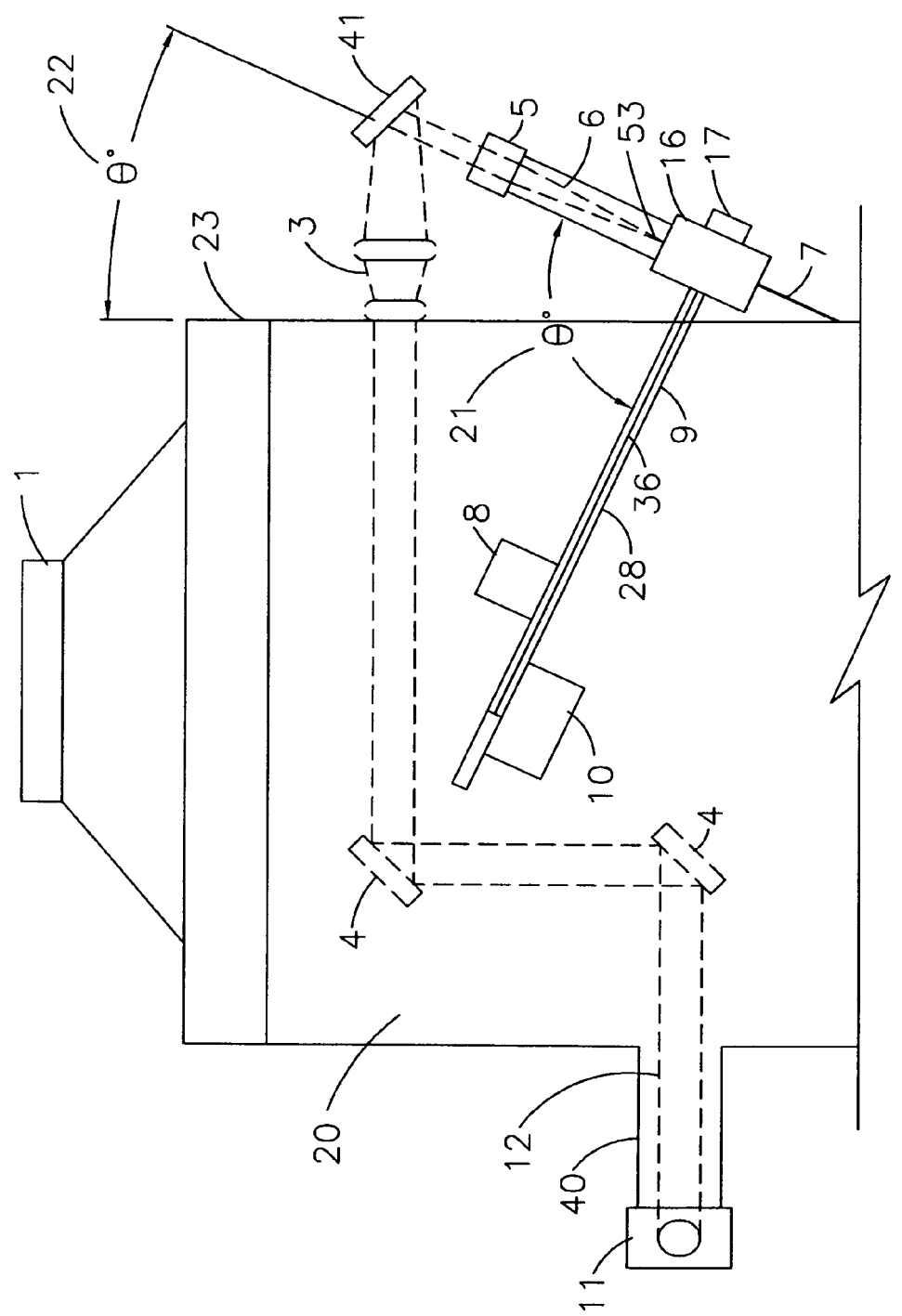
FIG. 2 is an expanded view of the hutch chamber and pressure chamber of an integrated rig apparatus for the production of boron nitride nanotubes.

Referring to FIG. 2, which is an enlarged schematic view of a portion of the integrated production apparatus, the target feed system 9 provides for supporting and continuously feeding a boron target 36 into the pressurized reaction chamber 16. The target feed system 9 is described in detail in Inventor's U.S. patent application Ser. No. 13/199,101 filed Aug. 19, 2011 and incorporated herein by reference in its entirety. The target feed system 9 comprises a target support 28 that supports the boron target 36 and mechanisms and controls for positioning the boron target 36 and continuously feeding the boron target 36 into the pressurized reaction chamber 16. A vertical/horizontal adjuster 10 controls the target feed system's 9 pitch and yaw. The boron target 36 is advanced into the pressurized reaction chamber 16 by a motor-driven chain drive 8. The rate of feed of the boron target 36 into the pressurized reaction chamber 16 can be adjusted and controlled in real time.

A laser (not shown) is used to produce the laser beam 12. Exemplary lasers suitable for use include, but are not limited to, gas lasers such as $CO_2$ lasers, free electron lasers, fiber lasers, and solid state lasers. The laser beam 12 is introduced into the integrated production apparatus via a pico-motor adjustable mirror 11 through beam tube 40. A plurality of transparent turning mirrors 4 direct the laser beam 12 through the hutch chamber 20 and through beam shaping optics 3. Upon passing though the beam shaping optics 3 a laser beam end portion turning mirror 41 directs the laser beam 12 toward the pressurized reaction chamber 16. That portion of the laser beam 12 beyond the laser beam end portion turning mirror 41 is referred to herein as the laser beam end portion 6. The laser beam end portion 6 is aligned to impact the boron target 36 tip at an impact angle 21 approximately normal to the boron target 36 tip (i.e. the impact angle 21 is approximately 90°). In a preferred embodiment the beam path 53 of the laser beam end portion 6 is aligned to form an alignment angle 22 between the first chamber wall 23 of the hutch chamber 20 and the beam path 53 of the laser beam end portion 6 that is about 23°±5°. In a preferred embodiment a ZnSe input window 5 admits the laser beam 12 into the pressurized reaction chamber 16.

Figure 3:
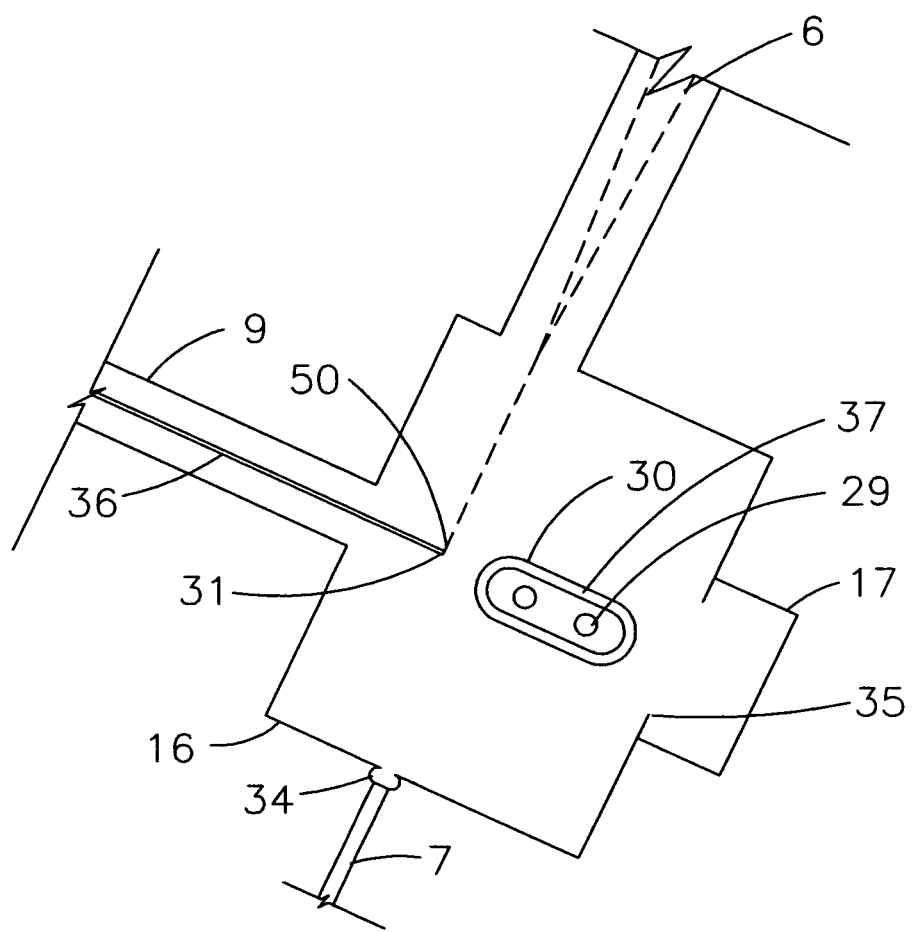
FIG. 3 is an expanded cross sectional view of the pressure chamber region of an integrated rig apparatus for the production of boron nitride nanotubes.

FIG. 3 is an enlarged schematic view of one embodiment of the pressurized reaction chamber 16 region of the integrated production apparatus of the invention. The boron target 36 is continuously moved into the pressurized reaction chamber 16 by the target feed system 9. The target feed system 9 is adjusted in position and/or rate of feed so that the target tip 31 intercepts the laser beam terminus 50 at an angle approximately normal to the target tip 31. The laser power delivered to the target tip 31 should be sufficient to vaporize the boron target tip 31 as the boron target 36 is continuously moved into the pressurized reaction chamber 16.

The pressurized reaction chamber 16 is pressurize by admitting nitrogen via nitrogen supply line 7 and valve 34 into the pressurized reaction chamber 16. In one representative embodiment, the nitrogen gas is maintained at a pressure of about 150 to about 200 psi. The introduction of nitrogen is controlled by a nitrogen control system.

Hot boron vapor is formed as the laser beam 12 vaporizes the boron target tip 31 of the boron target 36 and the boron vapor mixes with the nitrogen gas which dissociates to atomic nitrogen under the conditions present in the pressurized reaction chamber 16. The mixture of vaporized boron and nitrogen travels toward the continuous belt condenser 29. The continuous belt condenser 29 is has a moving belt 37 with a belt surface 30. In a preferred embodiment, both the position of the continuous belt condenser 29 and the rate of movement of the belt 37 are adjustable. The belt surface 30 acts as a filament nucleation site.

Boron nitride nanotubes attach to the belt surface 30 and boron nitride nanotube filaments propagate away there from in the direction of flow of the stream of boron vapor. Only a very small portion of the boron nitride nanotube material actually attaches to the surface of the nucleation site (i.e. belt surface 30.) Most of the material attaches to other boron nitride nanotubes to build filaments a often a centimeter or more in length. During the production process the belt 37 is moved to bring a fresh portion of the belt surface 30 in proximity to the target tip 31. While the nanotube fibers are preferentially formed on the portion of the belt 31 proximate the target tip 31, the portion of the belt 37 nearest to the target tip 31 at a given time should be sufficiently spaced away from the target tip 31 to allow for mixing of the vaporized boron with the nitrogen and to avoid damage to the belt 37 by the laser beam end portion 6.

Port 35 covered during operation by flange 17, provides access to the pressurized reaction chamber 16 to remove boron nitride nanotube product at the end of a production run. Optionally, the flange 17 may be equipped with chamber view ports (not shown) for visually monitoring the reaction via video monitoring.

The invention also provides a method of producing boron nitride nanotubes utilizing the apparatus described herein. In one embodiment, the boron nitride nanotubes are produced in the pressurized reaction chamber in the presence of nitrogen gas maintained at a pressure of about 150 to about 200 psi and hot boron vapor produced by vaporizing the boron target with a laser.

The boron-containing target is continuously introduced into the pressurized reaction chamber by the target feed system. The tip of the target is positioned so that it is impacted by the laser beam terminus at an angle substantially normal to the target tip. The laser beam is produced at a laser power of between about 1000 and about 2500 W. Boron target introduction and positioning is maintained and regulated by a motor driven target feed chain and a pitch and yaw target position adjuster.

The hot boron vapor contacts the nitrogen gas atomizing a portion of the nitrogen gas. The mixture of the hot boron vapor and nitrogen gas moves towards the moving belt condenser which is positioned proximate but spaced apart from the tip of the boron target. The surface of the moving belt condenser acts as a nucleation site. The boron nitride nanotubes attach to the surface of the moving belt condenser and boron nitride nanotube filaments propagate away there from in the direction of flow of the stream of boron vapor. The belt on the moving belt condenser is moved during the process to provide additional surface for collection of more nanotube filaments. This permits continuous collection of boron nitride nanotubes over a production run which can last for substantial period of time.

During a production run, the operator can control and adjust the flow rate of nitrogen gas, pressure, laser power, laser focus, feed rate of the target, position of the target and position and speed of the condenser loop via the feedback and control systems of the apparatus. Optionally, the operator may monitor the nanotube formation visually via a video monitoring system on the pressurized reaction chamber port. Preferably during operation, a positionable safety shield is positioned to cover the pressurized reaction chamber.

At the completion of a production run, boron nitride nanotubes can be removed manually via the pressurized reaction chamber port.

In one exemplary embodiment using a $CO_2$ laser, boron nitride nanotubes were produced at a rate of about 25 mg per hour. The nanotubes thus produced have a high-aspect ratio and a high crystallinity bonding structure. In one embodiment least 30% of the collected boron nitride nanotubes were boron nitride nanotube filaments at least 1 cm in length. In another embodiments least 50% of the collected boron nitride nanotubes were boron nitride nanotube filaments at least 1 cm in length and in another embodiment least 60% of the collected boron nitride nanotubes were boron nitride nanotube filaments at least 1 cm in length.

The boron-containing target may be compressed boron powder, compressed boron nitride powder, and mixtures thereof, for example. Typically a temperature of at least about 3200 to 4000° C. is needed to create the hot boron vapor.

Further, the inventors believe, without wishing to be bound to the theory, that no chemical catalyst and/or catalytic surface is needed to initiate the formation of the boron nitride nanotube fibers. The boron nitride nanotube fibers appear to form spontaneously and continuously by propagation outward (root growth) from the initial point of attachment on any suitable surface when hot boron vapor, vaporized carbon and nitrogen are present. This renders the Inventors' process fundamentally less complicated than carbon nanotube production in which a gas-borne cloud or coated surface of catalytic particles must be produced and kept active during the growth process. Accordingly, unlike for carbon nanotubes, the Inventors' production of boron nitride nanotube fibers is readily amendable to continuous production of material. Further the Inventors' process yields fibers which are at least a centimeter in length and typically centimeters in length which are highly desirable for commercial applications.

What is at present considered the preferred embodiment and alternative embodiments of the present invention has been shown and described herein. It will be obvious to those skilled in the art that various changes and modifications may be made therein without departing from the scope of the invention as defined by the appended claims.

What is claimed is:

1. An integrated production apparatus for production of boron nitride nanotubes via the pressure vapor-condenser method, the apparatus comprising:
   a. a pressurized reaction chamber containing a continuously fed boron containing target having a boron target tip, a source of pressurized nitrogen and a moving belt condenser apparatus;
   b. a hutch chamber proximate the pressurized reaction chamber containing a target feed system wherein the target feed system provides the continuously fed boron containing target to the pressurized reaction chamber, and a nitrogen control system in communication in communication with the source of pressurized nitrogen;
   c. a beam tube extending through said hutch chamber;
   d. an end portion turning mirror external to said hutch chamber; and
   e. a laser beam and optics wherein the optics direct the laser beam through said beam tube and to said end portion turning mirror, said end portion turning minor aligning said laser beam to impact said boron target in said pressurized reaction chamber.

2. The integrated production apparatus of claim 1 wherein the laser beam has a laser beam end portion and the laser beam end portion has a laser beam terminus and the laser beam terminus is aligned to impact the boron target tip at an angle approximately normal to the boron target tip.

3. The integrated production apparatus of claim 2 wherein the hutch chamber has a first chamber wall proximate the pressurized chamber and the laser beam end portion has a beam path wherein the angle formed between the first chamber wall and the beam path of the laser beam end portion is about 23°±5°.

4. The integrated production apparatus of claim 2, wherein said end portion turning minor directs said laser beam end portion and said laser beam terminus into the pressurized reaction chamber.

5. The integrated production apparatus of claim 1, wherein said integrated production apparatus is equipped with an exhaust.

6. The integrated production apparatus of claim 5, wherein the exhaust is equipped with a HEPA filter and a flow meter.

7. The integrated production apparatus of claim 1, wherein the nitrogen source is a pressurized line and the nitrogen control system comprise a needle valve, pressurized gauge and a regulator.

8. The integrated production apparatus of claim 1, wherein a plurality of transparent turning minors direct the laser beam though the hutch chamber.

9. The integrated production apparatus of claim 1, wherein the target feed system comprises a target support, a motor driven target feed and a target position adjuster.

10. The integrated production apparatus of claim 1, wherein the moving belt condenser apparatus comprises a moving belt having an adjustable rate of movement and a belt surface.

11. The integrated production apparatus of claim 10, wherein the position of the moving belt condenser is adjustable.

12. The integrated production apparatus of claim 11, wherein the moving belt condenser is placed proximate and spaced apart from the target tip and the position of the belt surface is adjustable with respect to the position of the target tip.

13. The integrated production apparatus of claim 1 further comprising a safety shield positionable to surround at least a portion of the pressurized reaction chamber.

14. A method of producing boron nitride nanotubes, the method comprising:
  a. providing an integrated production apparatus, the apparatus comprising: a pressurized reaction chamber containing a continuously fed boron containing target having a boron target tip, a source of pressurized nitrogen and a moving belt condenser apparatus including a belt surface; a hutch chamber proximate the pressurized reaction chamber containing a target feed system wherein the target feed system provides the continuously fed boron containing target to the pressurized reaction chamber, a nitrogen control system in communication with the pressurized nitrogen, a beam tube extending through said hutch chamber, an end portion turning minor external to said hutch chamber, a laser beam and optics wherein the optics direct the laser beam through said beam tube and to said end portion turning mirror, said end portion turning mirror aligning said laser beam to impact said boron target in said pressurized reaction chamber; and a safety shield positionable to surround at least a portion of the pressurized chamber;
  b. providing nitrogen gas to the pressurized reaction chamber to maintain a pressure of about 150 to 200 psi in the pressurized reaction chamber;
  c. providing a laser beam and maintaining a laser power of about 1000 to about 2500 W;
  d. directing the laser beam to the tip of the boron target; and
  e. collecting boron nitride nanotubes on the belt surface of the moving belt condenser apparatus.

15. The method of claim 14, further comprising positioning the safety shield to cover the pressurized reaction chamber.

16. The method of claim 14, further comprising moving the belt surface to change the position of the belt surface with respect to the target tip.

17. The method of claim 14, wherein the laser beam is produced by a $CO_2$ laser.

18. The method of claim 14, wherein at least 30% of the collected boron nitride nanotubes are boron nitride nanotube filaments at least 1 cm in length.

* * * * *